US012695075B2

(12) United States Patent
Grinfeld et al.

(10) Patent No.: US 12,695,075 B2

(45) Date of Patent: Jul. 28, 2026

(54) ION MIRROR

(71) Applicant: Thermo Fisher Scientific (Bremen) GmbH, Bremen (DE)

(72) Inventors: Dmitry Grinfeld, Bremen (DE); Hamish Stewart, Bremen (DE); Christian Hock, Bremen (DE); Alexander Wagner, Bremen (DE); Wilko Balschun, Bremen (DE); Alexander Makarov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 360 days.

(21) Appl. No.: 18/133,838

(22) Filed: Apr. 12, 2023

(65) Prior Publication Data

US 2023/0326734 A1 Oct. 12, 2023

(51) Int. Cl.
*H01J 49/06* (2006.01)

(52) U.S. Cl.
CPC .................................... *H01J 49/06* (2013.01)

(58) Field of Classification Search
CPC ........ H01J 49/06; H01J 49/022; H01J 49/406; H01J 49/405; H01J 49/062
See application file for complete search history.

(56) References Cited

U.S. PATENT DOCUMENTS

| | | | |
|---|---|---|---|
| 9,136,101 | B2 | 9/2015 | Grinfeld et al. |
| 10,141,176 | B2 | 11/2018 | Stewart et al. |
| 2007/0029473 | A1 | 2/2007 | Verentchikov |
| 2011/0017907 | A1 | 1/2011 | Makarov et al. |

FOREIGN PATENT DOCUMENTS

| | | | |
|---|---|---|---|
| GB | 2403063 | A | 12/2004 |

*Primary Examiner* — Robert H Kim

(57) ABSTRACT

An ion mirror for a time of flight mass spectrometer (ToF) is provided. The ion mirror is elongated from a first end to a second end along a drift direction (z) and is configured to reflect ions in a reflection direction (y) orthogonal to the drift direction. The ion mirror comprises a plurality of elongate mirror electrodes and at least one Fringe Field Correcting (FFC) assembly. Each of the elongate mirror electrodes extends in the drift direction. Each of the plurality of elongate mirror electrodes is configured to receive a respective mirror electrode voltage in order to provide an electrostatic field of the ion mirror. The at least one FFC assembly is provided at the first and/or second end of the ion mirror. The FFC assembly comprises a plurality of electrodes, the plurality of electrodes extending in a plane orthogonal to the drift direction, each electrode configured to receive a respective FFC voltage. The FFC assembly is configured to suppress a fringe perturbation of the electrostatic field of the ion mirror when biased with the FFC voltages.

15 Claims, 6 Drawing Sheets

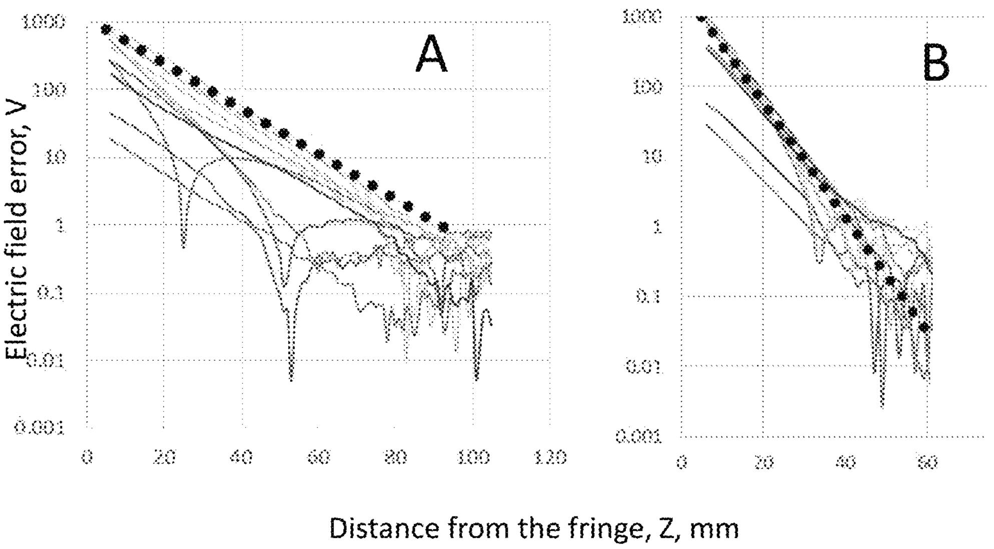
Fig. 9A
Fig. 9B
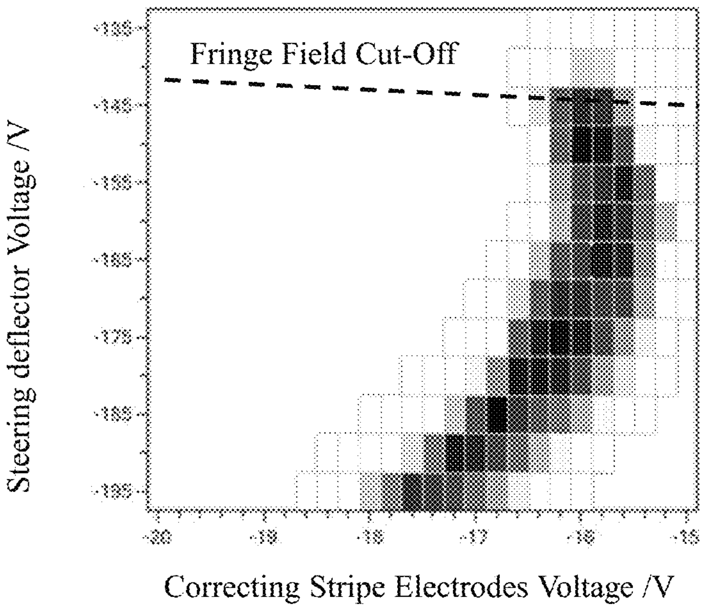
Fig. 10

ION MIRROR

CROSS REFERENCE TO RELATED APPLICATIONS

This application claims priority to Great Britain Patent Application No. GB2205333.4, filed Apr. 12, 2022, the entire contents of this application being incorporated herein by reference.

FIELD OF THE INVENTION

This disclosure relates to time of flight mass spectrometry. In particular, this disclosure relates to an ion mirror for a time of flight mass spectrometer.

BACKGROUND

An ion mirror is a device for reflecting ions. An ion mirror may be provided as part of a Time of Flight (ToF) mass spectrometer. GB 2,580,089 B discloses a multiple reflection ToF (MR ToF) comprising a pair of ion mirrors. FIG. 1 shows a diagram of the MR ToF of GB 2,580,089 B in which a pair of elongate ion mirrors is provided, the pair of mirrors arranged along a drift direction and opposing each other. Ions drift along the drift direction whilst being reflected between the mirrors (in a direction generally transverse to the drift direction). The length of the ion mirrors determines, at least in part, the number of reflections that can be accommodated by the MR ToF and, thus, the total flight path length that can be achieved using the MR ToF. The resolution achievable by the MR ToF is proportional to the flight path length of the MR-ToF. As such, by increasing the length of the ion mirrors (in the drift direction), the maximum resolution achievable by the MR-ToF may be increased.

The ion-reflecting electrostatic field of an ion mirror must be planar symmetric in order to accurately reflect ions for use in an MR ToF. At the elongate ends (in the drift direction) of an ion mirror, the electrostatic field deviates from planar symmetry. Accordingly, the usable region of an ion mirror is restricted to only a middle region. The end parts regions of an ion mirror, which may have a substantial length, may not be usable for ion reflection due to the electrostatic field not being planar symmetric.

Fringe field correctors (FFC) may be used to minimize the fringe field perturbation of an ion mirror. U.S. Pat. No. 9,082,602 B discloses a three dimensional ToF in which ions follow a three dimensional closed orbit defined by a set of electrodes arranged to form a plurality of electrostatic sectors. A FFC comprising a PCB having a plurality of wire tracks is provided between two main electrodes of a sector to be corrected. The wire tracks of the PCB are individually suppled with voltages using a resistive voltage divider.

Accordingly, one problem with prior art fringe field correcting electrodes is that they require a relatively large number of electrodes, each electrode supplied with a precise voltage via a resistor chain in order to provide a desired electric field with sufficient precision.

One problem with the voltage dividers used to provide such voltages is that the sequentially connected resistors (and any resistance drift over time) represents a long tolerance chain, in which the resistors' errors sum up. Accordingly, it is challenging to provide a fringe field correcting electrode and associated control circuitry which accurately corrects the fringe field of an ion mirror.

SUMMARY

According to a first aspect of the disclosure, an ion mirror for a time of flight mass spectrometer (ToF) is provided. The ion mirror is elongated from a first end to a second end along a drift direction (z) and is configured to reflect ions in a reflection direction (y) orthogonal to the drift direction. The ion mirror comprises a plurality of elongate mirror electrodes and at least one Fringe Field Correcting (FFC) assembly. Each of the elongate mirror electrodes extends in the drift direction. Each of the plurality of elongate mirror electrodes is configured to receive a respective mirror electrode voltage in order to provide an electrostatic field of the ion mirror. The at least one FFC assembly is provided at the first and/or second end of the ion mirror. The FFC assembly comprises a plurality of electrodes, the plurality of electrodes extending in a plane orthogonal to the drift direction, each electrode configured to receive a respective FFC voltage. The FFC assembly is configured to suppress a fringe perturbation of the electrostatic field of the ion mirror when biased with the FFC voltages.

The ion mirror of the first aspect of the disclosure comprises a FFC assembly which is configured to suppress a fringe field of the electrostatic field of the ion mirror when biased with the FFC voltages. The electrostatic field of the ion mirror can be thought of as a combination of an idealised planar symmetric electrostatic field for reflecting ions and the fringe field. The fringe field of the ion mirror is thus a perturbation of the idealised planar symmetric electrostatic field resulting from the termination of the elongate mirror electrodes at the ends of the ion mirror.

According to the first aspect, a FFC assembly may be provided at one or both ends of the ion mirror. The FFC assembly increases the proportion of the ion mirror where the electrostatic field is approximately planar symmetric such that the usable length (in the drift direction) of the ion mirror is increased. This in turn may allow an ion mirror to accept a greater number of reflections, and consequently a greater maximum flight length without increasing the overall size of the ion mirror. Thus, an increase in maximum resolution may be achieved by incorporating one or more FFC assemblies into an ion mirror. Alternatively, the overall dimensions of a ToF instrument may be decreased whilst maintaining the same maximum resolution by incorporating one or more FFC assemblies into the ion mirrors, entailing reduction of the occupied space, weight, and cost.

In some embodiments, the FFC assembly is configured to suppress the K harmonics with longest penetration lengths of the fringe field of the electrostatic field of the ion mirror, wherein K is a positive integer. It will be appreciated that the other harmonics are not fully suppressed. For example K may be at least 3, 5, 7, or 9. By suppressing harmonics of the fringe field with the longest lengths of penetration, the FFC assembly may reduce the length that the fringe field penetrates into the ion mirror (in the drift direction). In some embodiments, K may be no greater than 31, 25, 19, or 15. As such, the FFC assembly may not suppress the fringe field for higher order harmonics (which do not penetrate as far into the ion mirror), i.e. the FFC assembly is configured to correct the fringe field in a restricted range of the mirror extension (and not the "full" fringe field), namely at a specific distance from the fringe. This in turn simplifies the construction of the FFC assembly and the FFC voltages to be provided to the FFC assembly.

In some embodiments, at least two electrodes of the FFC assembly are configured to receive a voltage selected from the group of mirror electrode voltages to be applied to the plurality of elongate mirror electrodes. By utilising the mirror electrode voltages for at least some, if not all, of the FFC voltages, the ion mirror of the first aspect can be provided with a simplified design. In particular, the FFC assembly can be provided without requiring additional resistor chains and the like to provide a series of intermediate voltages which may be prone to drift over time. As such, in some embodiments, each electrode of the FFC assembly is configured to receive a voltage selected from the group of mirror electrode voltages to be applied to the plurality of elongate mirror electrodes.

In some embodiments, the FFC assembly comprises at least three electrodes, wherein one electrode of the FFC assembly is configured to receive a calibration voltage in order to calibrate the FFC assembly. While, from a design simplification perspective it may be preferably to utilise the mirror electrode voltages for the FFC voltages, it is also advantageous to be able to calibrate the FFC assembly. Such calibration can account for tolerances in the mechanical construction and assembly of the FFC assembly in the ion mirror for example. Thus, at least one electrode of the assembly may be connected to a calibration voltage to allow for some adjustment of the FFC voltage(s). The calibration voltage may be provided by a controller (or a voltage source outputting a calibration voltage, wherein the voltage source is controlled by a controller) connected to the ion mirror. In some embodiments, the calibration voltage may be superimposed on a mirror electrode voltage, such that at least one of the FFC electrodes receives a mirror electrode voltage with a regulated offset voltage provided by the calibration voltage.

In some embodiments, the elongate mirror electrodes of the ion mirror are arranged symmetrically about a plane (y-z) in which the ions are reflected and drift (which plane is orthogonal to the plane in which the FFC electrodes lie). As such, the trajectories of the ions lie predominantly in the plane of symmetry of the mirror. The plane of symmetry of the ion mirror lies along a central axis of the FFC assembly, about which the FFC assembly is symmetrical. Accordingly, the design of the electrodes for the FFC assembly may also be symmetrical about the plane of symmetry of the mirror. In this case, the computation of the FFC electrode shapes and voltages can be focused on one half on one side of the central axis, which is then mirrored on the other side.

In some embodiments, the plurality of electrodes of the FFC assembly are separated from each other by a plurality of boundary gaps. Each of the plurality of boundary gaps may follow a curve which extends in the plane of the FFC assembly. In effect, each boundary gap acts to provide an isolating region, or isolating gap between adjacent electrodes of the FFC assembly. In some embodiments, one or more of the boundary gaps may be filled with an electrically insulating material, for example a dielectric material. In particular, the boundary gaps may each be filled with a dielectric material having a higher dielectric strength than the dielectric strength of the gas filling the ion mirror. For example, air at atmospheric pressure has a dielectric strength of about 3 MV/m. In some embodiments, the dielectric material may have a dielectric strength of at least: 5 MV/m, 7 MV/m, 10 MV/m, 12 MV/m, 15 MV/m or 20 MV/m.

The plurality of boundary gaps may each define a minimum separation between the electrodes of the FFC assembly. Such a minimum separation may be selected to prevent or reduce electric breakdown between adjacent electrodes. As such, the minimum separation may be selected depending on the magnitude of the potential difference between adjacent electrodes. In some embodiments, the separation between adjacent electrodes may be selected as a constant (e.g. 1 mm) having an associated maximum potential difference, wherein the maximum allowable potential difference may then be used as a design criteria for the electrodes. That is to say, the voltages for the electrodes, and the resulting shape of the electrodes may be designed around a maximum allowable potential difference between adjacent electrodes based on the constant width. For example where the separation between electrodes in the plane of the FFC assembly is 1 mm, a maximum potential difference may be about 8 kV.

In some embodiments, the elongate mirror electrodes of the ion mirror define a rectangular internal cross section of the ion mirror having a length b in the reflection direction (y) and a width a in direction (x) normal to the reflection direction and the drift direction. That is to say, the ion mirror has a rectangular internal cross section of a by b. In some embodiments, the electrodes of the FFC assembly are bounded by the internal cross section. In embodiments where the plane of motion of ions in the ion mirror lies along a central axis of the FFC assembly, about which the FFC assembly is symmetrical, the FFC assembly may extend from the plane of motion of ions in a direction (x) normal to the reflection direction and the drift direction a distance of a/2. It will of course be appreciated that the ion mirror of the first aspect is not limited to ion mirrors having a rectangular internal cross section. For example, an ion mirror having an annular, elliptical, or arc shaped internal cross section (i.e. where the central axis of the FFC assembly follows a circular, elliptical or arch shaped path) may be provided.

In some embodiments, the set of FFC electrodes separated by the insulating gaps are defined by a set of non-overlapping domains (w) in the plane of the FFC assembly. The insulating gaps are defined by the boundaries of theses domains δω. A boundary between two domains follow the curves x=±δω(y) where y is the coordinate in the symmetry plane of the ion mirror and x is the coordinate orthogonal to the coordinate y. The mirror has a rectangular internal cross section having a length 'a' in the direction x and the length 'b' in the direction y.

Thus, in some embodiments each section of the FFC assembly along 'y' is considered to lie in a single domain $\omega_i$ or to intersect three domains: one middle domain that corresponds to a FFC electrode with a voltage $V_i$ and two outer domains which correspond to electrodes with a voltage $V_j$. The outer domains are configured symmetrically on both sides of the line x=0. The voltage distribution in the FFC plane (x,y) is therefore described by the formula:

$$U(x, y) = \begin{cases} V_i & -\delta\omega(y) < x < \delta\omega(y) \\ V_j & \text{otherwise} \end{cases}$$

save the non-zero widths of the insulating gaps.

The field error in the FFC plane is the difference $\Delta\Phi = U(x, y) - \Phi_0(x,y)$, where $\Phi_0$ is the ideal 2D potential distribution in absence of the fringe effects.

In some embodiments, the shapes of the FFC electrodes are defined by the boundary functions δω(y). The boundary functions may be defined such that the field error ΔΦcontains no spatial harmonics of the type cos(πx/a) times any function of y. There are many harmonics of this type which differ by the function of y. All these harmonics are known to have penetration lengths of a/π or shorter, over which their amplitudes fall by factor of the Euler constant 'e'.

This condition of elimination of all harmonics of the said type may be fulfilled by the following choice of the boundary functions:

$$\delta\omega(y) = \frac{a}{\pi}\operatorname{asin}\frac{\Phi_{av}(y) - V_j}{V_i - V_j}$$

$$\text{where: } \Phi_{av}(y) = \frac{\pi}{a}\int_0^{a/2} \Phi_0(x, y)\cos\frac{\pi x}{a}dx$$

and the ideal 2D potential distribution in the absence of the fringe effects $\Phi_0$ may be calculated by any available 2D field simulation method.

In these embodiments, as the harmonics of the type cos(Thx/a) are eliminated by the said choice of the shapes of the FFC electrodes, the residual non-zero fringe-field harmonics are of the type cos(πkx/a) where k=3, 5, 7 . . . . The maximum penetration length of the residual non-zero harmonics is a/πk, which is three times shorter than the penetration length of the eliminated harmonics. Therefore, the extent of the fringe field is reduced by at least factor of three.

In some embodiments, the harmonics of the type cos(3πx/a) times any function of y may also be eliminated by an appropriate choice of two boundaries $x=\pm\delta\omega_1(y)$ and $x=\pm\delta\omega_2(y)$ that separate up to five FFC electrodes in every section of the FFC assembly along y (i.e. in every section where y is constant). In these embodiments, only the residual harmonics with k=5, 7 . . . are non-zero, and the fringe field penetration length is reduced by at least factor of five. As such, in such embodiments each section 'y' is considered to lie in a single domain $\omega_i$ or to intersect up to five domains: one central domain that corresponds to a FFC electrode with a voltage $V_i$, two mid-domains which correspond to electrodes with a voltage $V_j$, and two outer domains which correspond to electrodes with a voltage $V_i$.

In some embodiments, the voltages $V_i$ and $V_j$ may be selected from the group of mirror voltages applied to the elongate mirror electrodes.

In some embodiments, $V_i$ and $V_j$ are chosen to provide that the solution for δω(y) lies in the feasible interval 0≤δω(y)≤a/2. If the number of available voltages is more than two (e.g. more than two mirror electrode voltages are available), there is a certain freedom to define an order of voltages applied to the middle and the outer FFC electrodes in a particular section of the FFC assembly along y (i.e. in a particular section where y is constant). For the reason of design simplicity and manufacturing feasibility, it is beneficial to keep the assignment of voltages $V_i$ and $V_j$ continuous along the coordinate y. For example, any switch to another pair of voltages should be done only when the calculated boundary coordinate δω(y) goes beyond the interval 0≤δω(y)≤a/2.

In some embodiments, the FFC assembly is mounted to the ion mirror. In some embodiments, the FFC assembly comprises a plurality of conductive fasteners, the conductive fasteners configured to electrically connect one or more electrodes of the FFC assembly to the one or more elongate mirror electrodes where the FFC voltage is to be the same as the mirror electrode voltage of the respective elongate mirror electrode. That is to say, in some embodiments each electrode of the FFC assembly may be electrically connected to an elongate mirror electrode having the desired FFC voltage/mirror electrode voltage. Conductive fasteners provide a means to ensure that the FFC electrodes are held at the desired voltages without the use of resistor chains which drift over time. In some embodiments, dielectric fasteners (i.e. fasteners comprising a non-conductive material) may be used to mount an electrode to an elongate mirror electrode where the electrode of the FFC assembly and the elongate mirror electrode are to be held at different voltages.

According to a second aspect of the disclosure, a Time of Flight (ToF) mass spectrometer is provided. The ToF mass spectrometer comprises an ion source, an ion detector, and an ion mirror according to the first aspect configured to reflect ions on a flight path between the ion source and the ion detector.

It will be appreciated that the ToF mass spectrometer may incorporate any of the optional features of the ion mirror of the first aspect described above and any associated advantages. In some embodiments, the ToF mass spectrometer may be a single reflection ToF mass spectrometer comprising one ion mirror. As such, in some embodiments, the ion mirror of the ToF mass spectrometer may be configured to reflect ions on a flight path only once. In such embodiments, provision of one or more FFC assemblies may increase the usable space of the ion mirror in the drift direction such that the injection angle of ions into the ion mirror may be increased. The ion mirror of the first aspect may also be applied to ToF mass spectrometers comprising a plurality of single reflection ion mirrors.

In some embodiments, the ToF mass spectrometer of the second aspect further comprises a further ion mirror according to the first aspect, wherein the ion mirror and the further ion mirror are arranged opposing each other and configured to reflect ions between the ion mirror and the further ion mirror. As such, the ToF mass spectrometer may be a MR-ToF mass spectrometer. In some embodiments, the ion mirror and the further ion mirror may be angled towards each other along the drift direction. In such cases, each ion mirror is considered to have its own drift direction and associated co-ordinate system for the purposes of understanding the construction of each ion mirror.

In some embodiments of the MR-ToF mass spectrometer, each of the ion mirror and the further ion mirror comprises a first FFC assembly at a first end of the respective ion mirror and a second FFC assembly at a second end of the respective ion mirror. By providing FFC assemblies at each end of the two ion mirrors, ions may drift along the ion mirrors for longer distances without being disturbed by the fringe fields. This increases the number of oscillations between the mirrors and, therefore, the total length of flight. This in turn allows the MR-ToF mass spectrometer to achieve a higher resolution than would otherwise be possible without the FFC assemblies.

According to a third aspect of the disclosure, a method of time of flight mass spectrometry for a time of flight mass spectrometer is provided. The method comprises:

- applying mirror electrode voltages to respective mirror electrodes of an ion mirror according to the first aspect, the ion mirror arranged within the time of flight mass spectrometer;
- applying FFC electrode voltages to the at least one FFC assembly of the ion mirror;
- injecting ions into the time of flight mass spectrometer;
- reflecting the ions using the ion mirror; and
- detecting the ions.

As such, it will be appreciated that the ion mirror of the first aspect may be incorporated into a ToF mass spectrometer for the purpose of performing ToF mass spectrometry with improved resolution. It will be appreciated that the method may incorporate any of the optional features of the ion mirror of the first aspect described above and any associated advantages.

BRIEF DESCRIPTION OF THE DRAWINGS

The invention will now be described in relation to the following non-limiting figures. Further advantages of the disclosure will be apparent by reference to the detailed description when considered in conjunction with the figures in which:

FIG. 5 also shows equipotential lines which provide a solution to the 2D Laplace equation which constitutes the ideal electrostatic field distribution;

FIGS. 9A and 9B show graphs of the electrostatic field error and the distance from the nominal plane of the FFC assembly for (A) a non-compensated fringe and (B) with correcting the FFC assembly; and FIG. 10 shows an intensity map of ion transmittance when scanning the steering deflector voltage and the voltage applied to the correction stripes.

DETAILED DESCRIPTION

Figure 2:
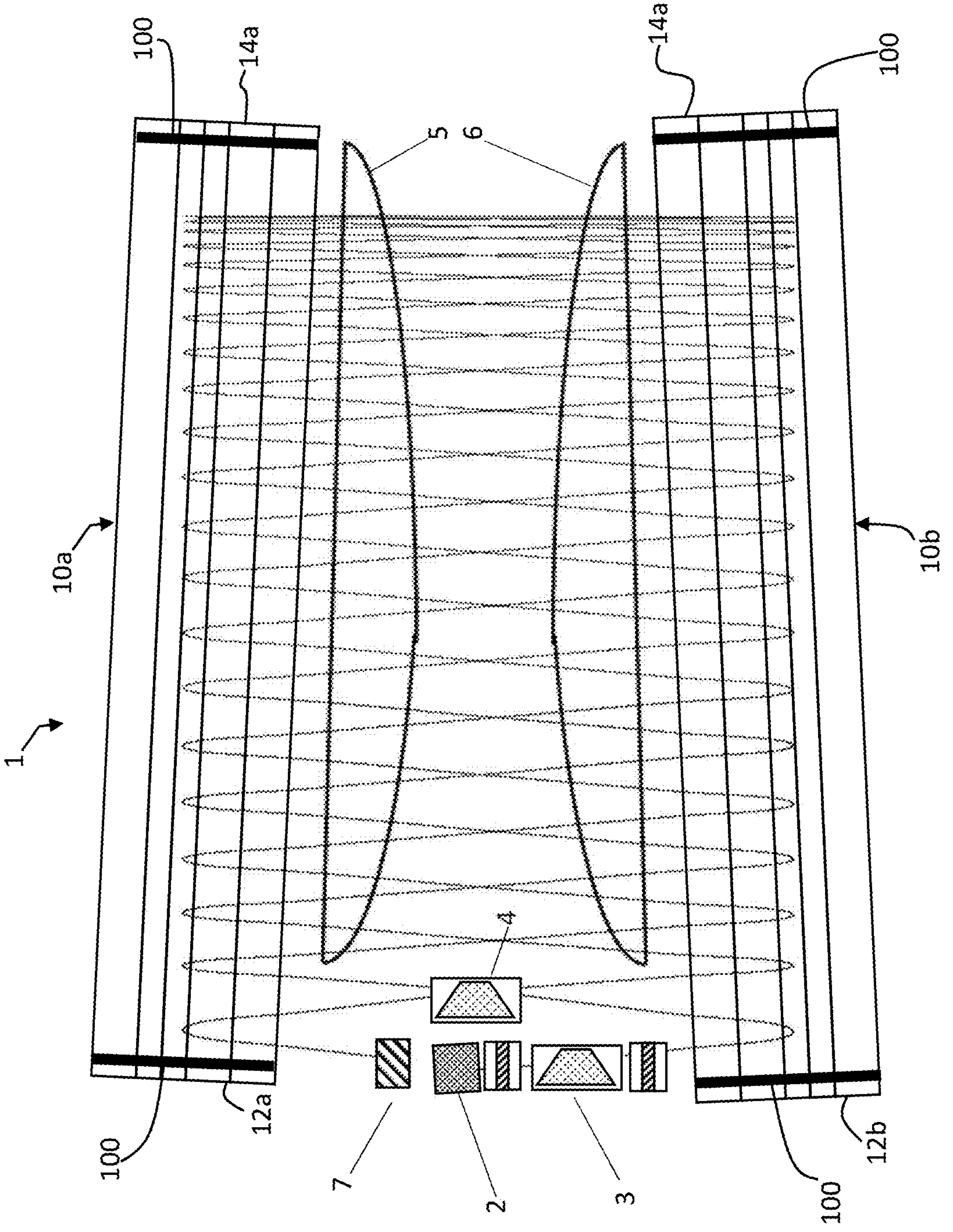
FIG. 2 shows a schematic diagram of a MR ToF comprising an ion mirror according to an embodiment of the disclosure.

According to a first embodiment of the disclosure, a Time of Flight (ToF) mass spectrometer 1 is provided. FIG. 2 shows a schematic diagram of the ToF mass spectrometer 1, which is an example of a MR-ToF mass spectrometer. The ToF mass spectrometer 1 comprises an ion trap 2, a collimator 3, a steering deflector 4, a first correcting stripe electrode 5, a second correcting stripe electrode 6 and a detector 7. The ToF mass spectrometer 1 also comprises a first ion mirror 10*a* and a second ion mirror 10*b* which are arranged as a pair of opposing ion mirrors.

Figure 1:
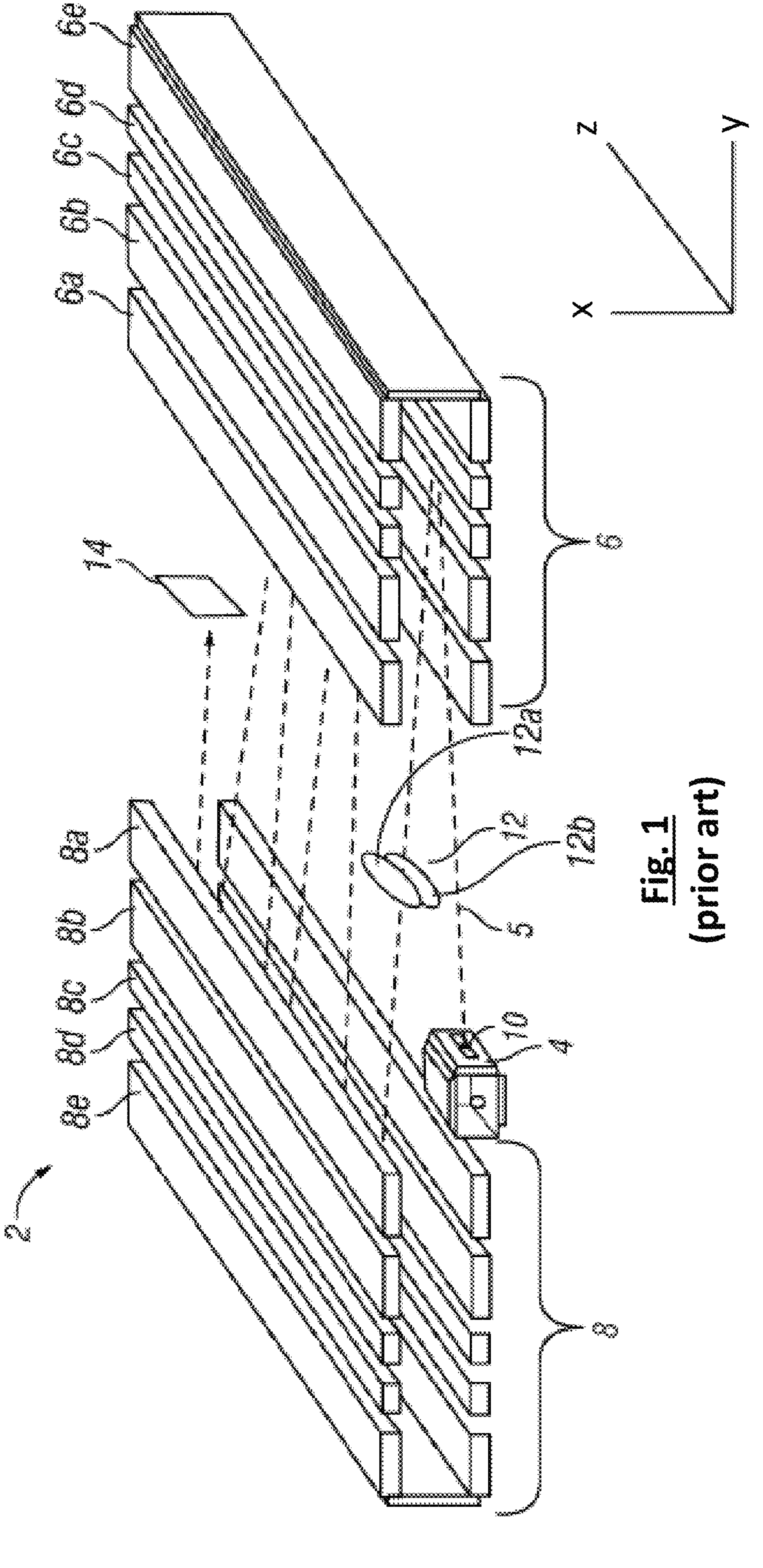
Fig. 1 (prior art)
FIG. 1 shows a schematic diagram of a MR ToF mass spectrometer disclosed in GB 2,580,089 B.

The ion trap 2 is configured to inject ions into the ToF 1 of FIG. 1. Ions may be generated from an ion source (not shown), for example an Electrospray Ionisation source or any other suitable ion source. The generated ions are accumulated the ion trap 2. In the embodiment of FIG. 1, the ion trap 2 is a linear ion trap, such as a rectilinear ion trap (R-Trap) or a curved linear ion trap (C-trap) for example. An ion beam is formed by extracting a packet of trapped thermalized ions from the linear ion trap 2 and injecting it at high energy (for example around +4 kV for positive ions) into the space between two opposing ion mirrors 10*a*, 10*b* by applying an appropriate accelerating/extraction voltage to electrodes of the ion trap 2. The collimator 3 is configured to shape the ion beam as it is injected into the first ion mirror 10*b*.

The first and second correcting stripe electrodes 5, 6 are provided to correct ToF aberrations induced by the non-constant mirror separation of the ion mirrors 10*a*, 10*b*. This arrangement, shown in FIG. 2, avoids scattering of the ion beam and both eliminates the need for a complex mirror construction and the need for a third ion mirror. Correcting stripe electrodes are known to the skilled person, for example as further described in WO 2008/047891. Alternatively, the ToF may be provided with an ion focusing arrangement (not shown) at least partly located between the opposing first and second ion mirrors 10*a*, 10*b* and configured to provide focusing of the ion beam in the drift direction (z), such that a spatial spread of the ion beam in the drift direction (z) passes through a single minimum at or immediately after a reflection having a number between 0.25N and 0.75N, wherein ions are detected by the detector after completing the same number N of reflections between the ion mirrors. Suitable ion focusing arrangements are further described in at least GB 2,580,089 B.

As shown in FIG. 2, the first and second ion mirrors 10*a*, 10*b* are arranged opposing each other. Each ion mirror is elongated from a respective first end 12*a*, 12*b* to a respective second end 14*a*, 14*b*. The first and second ion mirrors 10*a*, 10*b* in the embodiment of FIG. 2 are tilted towards each other by a small angle (Ω). In other embodiments, the ion mirrors 10*a*, 10*b* may be provided in a parallel manner, or any other arrangements of elongate first and second ion mirrors 10*a*, 10*b*.

The first and second ion mirrors 10*a*, 10*b* each comprise one or more FFC electrode assemblies 100. As shown in FIG. 2, each of the first and second ion mirrors 10*a*, 10*b* have an FFC assembly 100 located at each of the first and second ends 12*a*, 12*b*, 14*a*, 14*b*.

In the embodiment of FIG. 2, each of the first and second ion mirrors 10*a*, 10*b* may be constructed in substantially the same manner. Thus, it will be appreciated that the following description of an ion mirror 10 may apply equally to the first and second ion mirrors 10*a*, 10*b* in the embodiment of FIG. 2.

Figure 3:
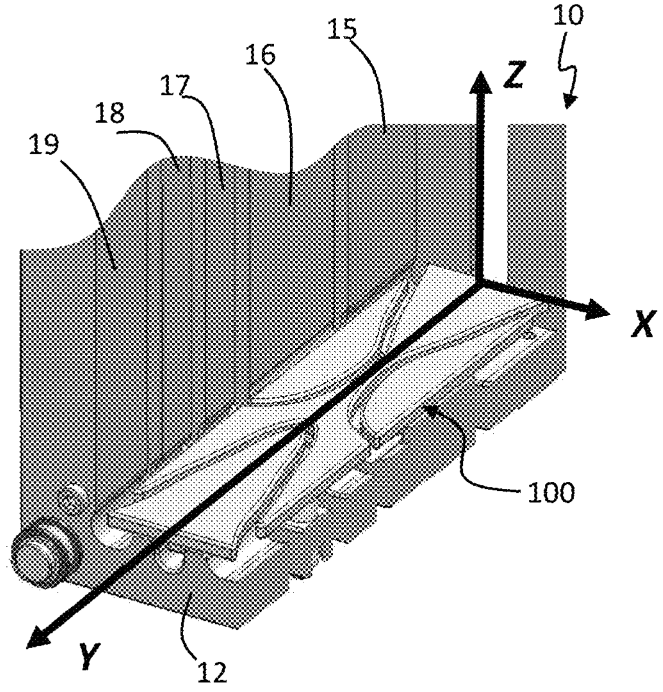
FIG. 3 shows an isometric view of a FFC assembly for the MR ToF of FIG. 2.
Figure 4:
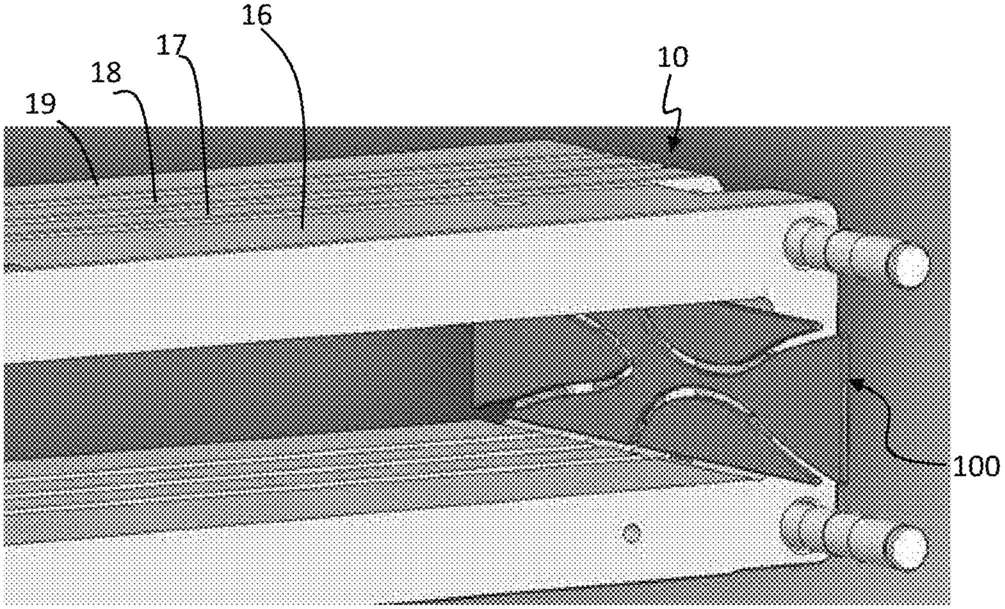
FIG. 4 shows a further isometric view of a FFC assembly for the MR ToF of FIG. 2.

FIG. 3 shows an isometric view of a first end 12 of an ion mirror 10. The ion mirror 10 comprises five pairs of elongate mirror electrodes 15, 16, 17, 18, 19 which are each elongated in the drift direction (Z). Each pair of elongated mirror electrodes is spaced apart in the X direction, for example as shown in the isometric view of FIG. 4. FIG. 4 shows a further isometric view of the ion mirror, wherein the first elongate mirror electrode 15 is not shown. In each pair of elongate mirror electrodes 15, 16, 17, 18, 19, there is one electrode positioned above the ion beam and one electrode below the beam (i.e. the elongate mirror electrodes are spaced apart in the X direction).

Figure 5:
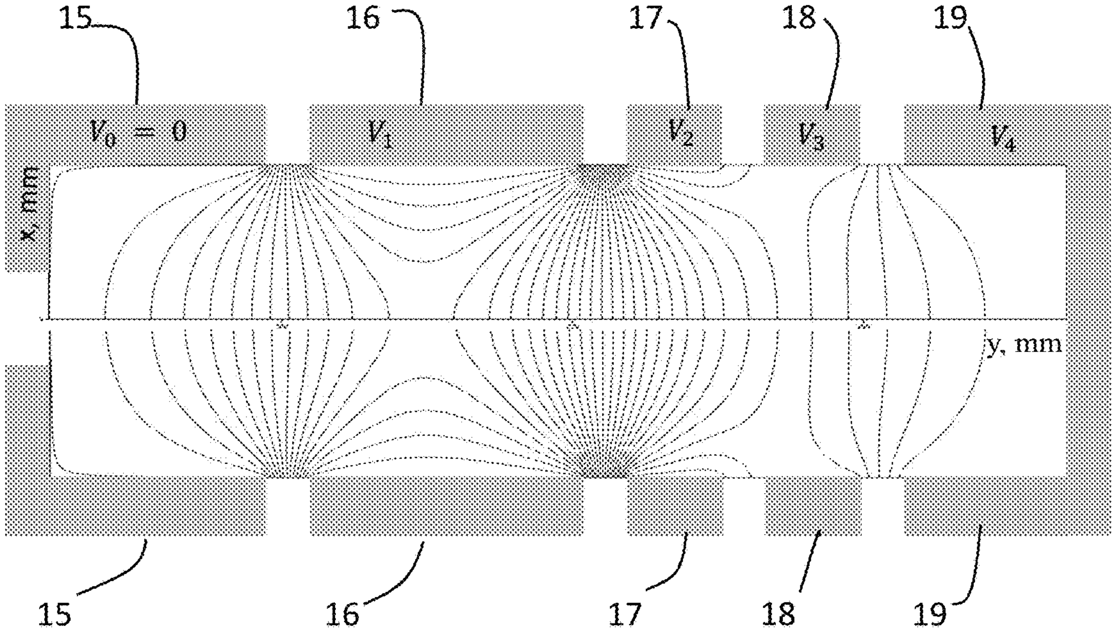
FIG. 5 is a diagram of a cross-section of an ion mirror comprising five elongate mirror electrodes, each elongate mirror electrode supplied with a different mirror voltage.

FIG. 5 shows a cross sectional view of the ion mirror in the X-Y plane at a point along the drift direction between the first and second ends 12, 14 of the ion mirror 10. It will be appreciated that the ion mirror 10 has a generally rectangular internal cross-section which is defined by the internal surfaces of the elongate mirror electrodes 15, 16, 17, 18, 19.

As shown in FIG. 5, each of the elongate mirror electrodes 15, 16, 17, 18, 19 is provided with a respective voltage $V_0$, $V_1$, $V_2$, $V_3$, $V_4$, in order to provide an electrostatic field for reflecting ions. For example, Table 1 shows one suitable set of voltages that may be used by the ion mirror 10 to reflect positively charged ions:

TABLE 1

| Mirror voltage | Voltage (V) |
|---|---|
| $V_0$ | 0 |
| $V_1$ | −7350 |
| $V_2$ | 4565 |
| $V_3$ | 3700 |
| $V_4$ | 6000 |

It will be appreciated that for negatively charged ions the polarities of the above voltages may be reversed.

The ion mirror 10 is configured to reflect ions travelling along the Y-axis indicated in FIG. 5. It will be appreciated from FIGS. 5 and 2 that ions enter the ion mirror 10 through the opening provided between the first elongate mirror electrodes 15. The transverse motion of the ions (in the Y direction) is then reflected by the electrostatic field of the ion mirror 10 and the ions exit the ion mirror through the opening between the first elongate mirror electrodes 15. It will be appreciated that while the ions travel through the ion mirror, the velocity of the ions in the drift direction is largely unaffected, such that the ions continue to drift in the drift direction (Z). Accordingly, the motion of the ions when travelling through the ion mirror 10 is substantially within the Y-Z plane of the ion mirror 10.

In the embodiment of FIG. 2, it will be appreciated that the ions may be reflected between the opposing first and second ion mirrors 10*a*, 10*b*. As such, the ions follow an oscillating, or zig-zag, path between the first and second ion mirrors.

In accordance with the generally planar motion of the ions through the ion mirror, the electrostatic field provided by the elongate mirror electrodes 15, 16, 17, 18, 19 is generally planar symmetric for the purpose of reflecting ions in a direction (y) generally transverse to the drift direction between the first and second ion mirrors 10*a*, 10*b*.

In this example, the available space between mirrors (i.e. the distance in direction y between the first elongate mirror electrodes 15 of each mirror 10*a*, 10*b*) is about 300 mm and the total effective width of the MR-ToF spectrometer (i.e. the effective distance in the y direction between the average turning points of ions within the mirrors) is about 650 mm. The total length (i.e. in direction z) is 550 mm to form a reasonably compact analyser. Of course, in other embodiments, ion mirrors 10 having different dimensions may be provided.

It will be appreciated that the arrangement of the elongate mirror electrodes 15, 16, 17, 18, 19 within the ion mirror 10 is well understood in the art. For example, U.S. Pat. No. 9,136,101 B and GB 2,580,089 B each provide further discussion of elongate mirror electrodes 15, 16, 17, 18, 19 for ion mirrors 10*a*, 10*b* of a MR-ToF.

As shown in FIG. 2, each of the first and second ion mirrors 10*a*, 10*b* comprises at least one FFC assembly 100. FIG. 3 shows a schematic diagram of an FFC assembly 100 located at a first end 12 of an ion mirror 10. As shown in FIG. 3, the FFC assembly 100 is located in a plane (the X-Y plane in FIG. 3) orthogonal to the drift direction (the Z-direction) of the elongate mirror electrodes 15, 16, 17, 18, 19 of the ion mirror 10.

The FFC assembly 100 comprises a plurality of electrodes 102, 104, 106, 108. As shown in FIGS. 3 and 4, each of the plurality of electrodes 102, 104, 106, 108 is a generally flat (i.e. plate-shaped) electrode. That is to say, each of the plurality of electrodes 102, 104, 106, 108 has a respective electrode surface which extends in a plane. The plurality of electrodes 102, 104, 106, 108 of the FFC assembly 100 are arranged such that they extend in the same plane, which is orthogonal to the drift direction of the ion mirror (Z). It will be appreciated from FIGS. 3 and 4 that the FFC assembly 100 is shaped to fit within the region between the elongate mirror electrodes 15, 16, 17, 18, 19 of the ion mirror 10. That is to say, the FFC assembly 100 is bounded by the elongate mirror electrodes 15, 16, 17, 18, 19 of the ion mirror 10.

Figure 6:
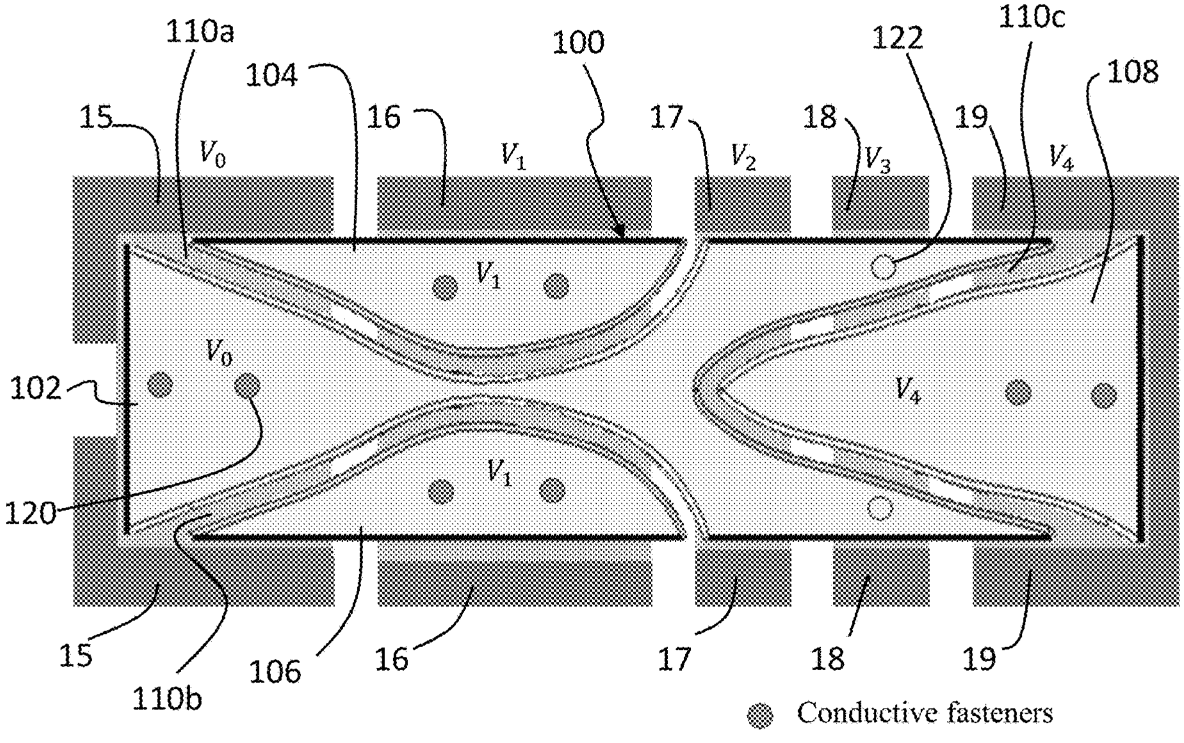
FIG. 6 shows a plan view schematic diagram of a FFC assembly according to an embodiment of the disclosure.

A plane view of the FFC assembly 100 is shown in FIG. 6 (looking at the FFC assembly 100 in the Z-direction). As shown in FIG. 6, each electrode 102, 104, 106, 108 is shaped, and separated from the other electrodes 102, 104, 106, 108 by one or more boundary gaps 110*a*, 110*b*, 110*c*. The boundary gaps 110*a*, 110*b*, 110*c* each follow a respective curve ($x=\pm\delta\omega(y)$) which extends in the plane of the FFC assembly 100. The equations used to determine each curve for each boundary gap are discussed in more detail below. The boundary gaps 110*a*, 100*b*, 110*c* in combination with the boundary defined by the elongate mirror electrodes 15, 16, 17, 18, 19 defines the shape of each of the electrodes 102, 104, 106, 108.

While each boundary gap 110*a*, 110*b*, 110*c* follows a curve in the plane of the FFC assembly 100, it will be appreciated that each boundary gap has a non-zero width in a direction normal to the curve in the plane of the FFC assembly 100 (i.e. a thickness of the curve in the plane of the FFC assembly 100). The width of each boundary gap 110*a*, 110*b*, 110*c* may be selected to provide a minimum separation between each of the electrodes 102, 104, 106, 108. Such a minimum separation may be provided to ensure that electrical breakdown does not occur between the electrodes 102, 104, 106, 108. For example, where a potential difference of around 8 kV may be provided between adjacent electrodes 102, 104, 106, 108, the width of each boundary gap 110*a*, 110*b*, 110*c* may be at least 1 mm wide.

As mentioned above, each of the electrodes 102, 104, 106, 108 may be a generally plate shaped electrode. In the embodiment of FIGS. 3, 4, and 6, the electrodes are formed from a material having a generally constant thickness (in the Z direction) of at least 5 mm. The electrodes may be formed from any suitable material for use as a plate electrode. As shown in FIGS. 3, 4 and 6, the edges of each of the electrodes 102, 104, 106, 108 may optionally be chamfered in order to reduce fringe penetration of electrode voltages through the gaps between compensation electrodes.

In some embodiments, one or more of the boundary gaps 110*a*, 110*b*, 110*c* may be filled with an electrically insulating material, for example a dielectric material. In particular, the boundary gaps 110*a*, 110*b*, 110*c* may each be filled with a dielectric material having a higher dielectric strength than the dielectric strength of the gas filling the ion mirror 10. For example, air at atmospheric pressure has a dielectric strength of about 3 MV/m. In some embodiments, the dielectric material may have a dielectric strength of at least: 5 MV/m, 7 MV/m, 10 MV/m, 12 MV/m, 15 MV/m or 20 MV/m.

As shown in FIG. 6, the electrodes 102, 104, 106, 108 of the FFC assembly 100 are mounted to the ion mirror 10 by conductive fasteners 120 and/or dielectric fasteners 122. As such, the conductive fasteners 120 and the dielectric fasteners 122 of the FFC electrodes assembly are used to directly attach the FFC assembly 100 to the ion mirror 10.

As described in more detail below, one advantage of the FFC assembly 100 is that the voltages provided to the electrodes 102, 104, 106, 108 may be the same as the voltages provided to the elongate mirror electrodes 15, 16, 17, 18, 19 of the ion mirror 10. Thus, the appropriate use of conductive fasteners 120 and dielectric fasteners (i.e. non-conductive fasteners) provides a simple design solution to provide the electrodes 102, 104, 106, 108 with the appropriate FFC voltages.

For example, as shown in FIG. 6, electrode 102 is designed to be provided with a FFC voltage of $V_0$. Accordingly, electrode 102 is connected to elongate mirror electrode 15 which has a mirror voltage of $V_0$ using conductive fasteners 120. To provide stability for each of the electrodes 102, 104, 106, 108, each electrode may be mounted to the ion mirror 10 using a plurality of fasteners. Similarly, conductive fasteners 120 are used to connect electrodes 104 and 106 to elongate mirror electrode 16 which has a mirror voltage $V_1$, and to connect electrode 108 to elongate mirror electrode 19 which has a mirror voltage $V_4$. Where it is desired to connect an electrode 102 to an elongate mirror electrode at a different voltage (e.g. mirror electrode 18 at $V_3$), a dielectric fastener 122 may be used.

The conductive fasteners 120 may be any suitable fastener which is electrically conductive and can be used to attach a plate shaped electrode to the ion mirror 10. For example, the conductive fastener 120 may comprise a metal screw or bolt and the like. The dielectric fasteners may be any suitable fastener which is electrically insulating and can be used to attach a plate shaped electrode to the ion mirror 10. For example, the dielectric fastener may comprise a plastic screw, a plastic bolt, a ceramic screw, or a ceramic bolt and the like.

As discussed above, the boundary gaps 110*a*, 110*b*, 110*c* each follow one or more curves which at least in part define the shape of the electrodes 15, 16, 17, 18, 19. The curved shape of each boundary gap 110*a*, 110*b*, 110*c* is designed, in combination with the shape of the elongate mirror electrodes (in the X-Y plane) and voltages to be applied to the elongate mirror electrodes to suppress the first K harmonics of the fringe field of the ion mirror (i.e. the K harmonics having the longest penetration lengths). As such, it will be appreciated that the present disclosure is not limited to the shape of the boundary gaps 110*a*, 110*b*, 110*c* shown in FIGS. 3, 4 and 6. Rather, according to this disclosure, the boundary gaps 110*a*, 110*b*, 110*c* (and thus the resulting electrode shapes of the FFC assembly 100) may be provided in accordance with the following design analysis.

In the following analysis, the ion mirror shown in FIG. 3 is considered to be elongated in the positive direction of the axis z and also to be symmetrical with respect to translation along z in the half-space z>0. In the said half-space, the electrode geometry is completely described by the boundary an of a domain Ω of the plane (x,y) orthogonal to the axis z. A set of axes denoting the directions of x,y and z have been added to the diagram of FIG. 3 to show the orientation of the axes relative to the ion mirror 10. Practical applications are most applicable to the cases where the domain Ω is closed and the solution to the 2D Laplace equation in Ω is defined by the elongate mirror electrode voltages on its boundary δΩ (e.g. voltages $V_0$ to $V_4$ in the embodiment of FIG. 5). This solution is denoted hereafter as $\Phi_0(x, y)$. Of course, practical cases are not only limited to exactly closed domains Ω but may also have an almost closed domain characterized (not strictly) by the conditions that the electric field $\Phi_0$ is almost completely defined by the boundary conditions and the error is under an acceptable level.

As shown in FIG. 3, the geometry in the domain z≤0 has no translational symmetry. On the contrary, the electrodes terminate at z=0.

The electric field in the 3D domain $\Omega_+ + \Omega \times R_+$, where $R_+$ is the positive half-axis z>0, may be described as a sum of the 'ideal' field $\Omega_0$ and a series of harmonics:

$$\Phi(x, y, z) = \Phi_0(x, y) + \sum_{k=1}^{\infty} C_k \psi_k(x, y) \exp\left(-\frac{z}{\lambda_k}\right),\ \lambda_k = 1/\sqrt{\nu_k} \quad (1)$$

where $\psi_k$ are orthonormalized eigenfunctions of the 2D Laplace equation in the domain Ω with zero boundary conditions on δΩ and $\nu_k$ the corresponding eigenvalues. In the case that the domain Ω is not closed, zero boundary conditions for $\psi_k$ are presumed in the infinity. The sum of said harmonics represents the fringe field perturbation which decreases exponentially with the distance z from the fringe, and $\lambda_k$ is corresponding penetration length on which the k-th harmonic decreases by factor of the number 'e'. Assuming that the eigen-values are in increasing order $\nu_1 \le \nu_2 \le \ldots$, the penetration lengths $\lambda_k$ are in decreasing order. The harmonics with smaller indexes k penetrate farther along the axis z. If the amplitude $C_1$ is non-zero, the fringe field has the asymptotical behavior $\sim\exp(-z/\lambda_1)$ at a large enough distance from the fringe. Due to the property of eigen-values, the largest penetration distance $\lambda_1$ has the same order as the transversal size of the domain Ω, the exact formula depending on its shape. For a rectangular domain with sides a and b, the penetration lengths are:

$$\lambda = \frac{1}{\pi}\left(\frac{m^2}{a^2} + \frac{n^2}{b^2}\right)^{-1/2},\ m, n = 1, 2, 3 \ldots \quad (2)$$

where m and n are some natural numbers, and the largest of them $\lambda_1 = \pi^{-1}(a^{-2}+b^{-2})^{-1/2}$ corresponds to m=n=1.

As discussed above, the termination of the elongate mirror electrodes 15, 16, 17, 18, 19 of the ion mirror introduces a disruption to the planar symmetric electrostatic field. This disruption, the fringe field, can be considered separately to the planar symmetric electrostatic field. The fringe-field error at z=0 is the difference $U(x,y)-\Phi_0(x, y)$ where U is the boundary potential on z=0 boundary of $\Omega_+$. According properties of orthonormalized eigenfunctions, the coefficients:

$$C_k = \iint_{\Omega} (U(x, y) - \Phi_0(x, y))\psi_k(x, y)\,dx\,dy \quad (3)$$

One possible method to minimize the fringe field harmonics would be to set the boundary condition $U(x, y)=\Phi_0(x,y)$ by means of a PCB with the current-leading stripes coinciding with equipotential lines of $\Phi_0$ and individual voltages provided by e.g. a resistive voltage divider or a homogeneous high-resistance conductive surface. Though such methods are capable of complete compensation of the fringe field perturbation in the working domain, their practical implementation is challenging. For example, small variations in the resistance of each resistor used to define the voltage of each current leading stripe can have a significant impact on the fringe field compensating effect. Similarly, as the resistance values drift over time, the resulting variation in the compensating effect reduces the effectiveness of such designs.

According to embodiments, the electrodes 102, 104, 106, 108 of the FFC assembly 100 are configured to form a specific electric potential distribution U(x, y) in the plane z=0 such that the coefficients $C_1=C_2= \ldots =C_K$ are annihilated. The first non-zero harmonic in the sum (1) will have the penetration length $\lambda_{K+1}$ that is shorter than $\lambda_1$ and, therefore, the fringe field penetration length is reduced by a factor of $\lambda_{K+1}/\lambda_1$. For a sufficiently large K, this ratio results in a practically acceptable fringe field penetration reduction, whilst the required boundary field U(x,y) is easier to implement with a small number of specially shaped compensation electrodes. As such, the FFC assembly 100 may be designed to compensate for the most significant harmonics of the fringe field in order to bring about an associated reduction in the penetration of the fringe field (in the drift direction) into the ion mirror 10.

To define appropriate shapes for the electrodes 102, 104, 106, 108 of the FFC assembly 100 mathematically, the domain $\Omega$ is split into a set of non-overlapping subdomains $\omega_i$ whose boundaries are to be determined. The potential distribution at z=0 is sought in the form:

$$U(x,y)=V_i \text{ if } (x,y)\in\omega_i \tag{4}$$

where the set of voltages $V_i$ is preselected and fixed. In the embodiment of FIGS. 3, 4 and 6, the set of voltages $V_i$ are the voltages $V_0$ to $V_4$.

A computation is needed to determine smooth boundaries between $\omega_i$ so that a number of coefficients from $C_1$ to $C_K$ vanish. As the number of equations K is finite and the boundaries between the domains $\omega_i$ make up a continuum, the solution to the problem exists under rather general conditions. A sufficient condition is that the voltage interval min{V} . . . max{V} comprises all boundary voltages on $\delta\Omega$, which is satisfied when the set of voltages $V_i$ comprises the minimal and the maximal voltages of the elongate mirror electrodes 15, 16, 17, 18, 19. For example, in the embodiment of FIGS. 3, 4 and 6, the minimal voltage is −7350 V and the maximal voltage is +6000 V. A practical restriction is topological simplicity of the subdivision $\omega_i$ to ensure feasibility of the design.

The FFC assembly 100 of FIGS. 3, 4 and 6 provides an illustration of the processes for designing appropriately shaped electrodes 102, 104, 106, 108, for a FFC assembly 100. Thus, the ion mirror 10 is considered to be an ion mirror 10 of rectangular internal cross-section with sides a and b, such that b>>a, and the voltages are supposed to be applied symmetrically both sides of the axis x=0. The orthonormalized eigenfunctions of the Laplace equation in the rectangular domain are:

$$\psi_{mn}=\sqrt{\frac{2}{ab}}\cos\frac{\pi(2m-1)x}{a}\sin\frac{\pi ny}{b}, \tag{5}$$
$$m=1,3,5\ \ldots\ ,\ n=1,2,3\ \ldots$$

where the x symmetry is assumed. The longest penetration length:

$$\lambda_1=\pi^{-1}\left(a^{-2}+b^{-2}\right)^{-\frac{1}{2}}\approx\frac{a}{\pi}$$

takes place for: m=n=1, and is followed by a series with: m=1 and: n=2, 3 . . . K, where K is the integer part of the number: $\sqrt{8b^2/a^2+1}$. The next series belongs to: m=2, and the longest penetration length in this series is under $a/3\pi$ which is approximately three times shorter than $\lambda_1$.

Orthogonality of the fringe potential distribution U(x,y) to the function $\cos(\pi x/a)$ is a sufficient condition to make $C_1$ . . . . $C_K$ all zero. Let us define:

$$U(x,y)=\begin{cases}V_i, & -\delta\omega(y)<x<\delta\omega(y)\\ V_j, & \text{otherwise}\end{cases} \tag{6}$$

where $\pm\delta\omega(y)$ are the boundaries between the middle domain $\omega_i$ where the voltages $V_i$ is applied and outer domain $\omega_j$ (split into two non-connected parts) which bears the potential $V_j$. As such, for each pointy along the FFC assembly 100 the non-overlapping domains comprise a middle domain ($\omega_i$) and outer domains ($\omega_j$). The middle domain ($\omega_i$) intersects the plane of ion motion (which is orthogonal to the FFC assembly 100). The extent to which each middle domain extends orthogonally to the plane of ion motion (i.e. in the x direction) depends on $\delta\omega(y)$. Accordingly the boundary gaps 110*a*, 110*b*, 110*c* which separate each of the electrodes follow the curves defined by $x=\pm\delta\omega(y)$ which separates the middle and outer domains according to the above equations.

The two voltages $V_i$ and $V_j$ are to be selected depending on the coordinate y. The orthogonality condition says:

$$\int_0^{a/2}\left(U(x,y)-\Phi_0(x,y)\right)\cos\frac{\pi x}{a}dx=0 \tag{7}$$

for every y∈(0 . . . b). Its explicit solution for $\delta\omega(y)$:

$$\delta\omega(y)=\frac{a}{\pi}\operatorname{asin}\frac{\Phi_{av}(y)-V_j}{V_i-V_j} \tag{8}$$

$$\text{where: }\Phi_{av}(y)=\frac{\pi}{a}\int_0^{a/2}\Phi_0(x,y)\cos\frac{\pi x}{a}dx \tag{9}$$

is the weighted average of the ideal field $\Phi_0$ in a y-section. A choice of $V_i$ and $V_j$ should guarantee that the solution lies in the feasible interval: $0\le\delta\omega(y)\le a/2$. If the number of available voltages is more than two (e.g. more than two mirror electrode voltages are available), there is a certain freedom to define a plurality of domain sections extending in the reflection direction. Each domain section has a middle domain and an outer domain wherein the voltages to be applied ($V_i$ and $V_j$) to the respective middle and outer domains may be different in different domain sections. As such, the indexes i=i(y) and j=j(y) may be defined for every domain section. To have the boundary $\delta\omega(y)$ with a smallest possible number of discontinuities, these indexes must be re-assigned only where $\delta\omega(y)$ reaches the boundaries of the feasible interval, zero or a/2. For example, in some embodiments a FFC assembly 100 may be provided having two or more domain sections, wherein a boundary between the two domain sections is formed at a point along the reflection direction of the FFC assembly (e.g. y=y*). The middle domain of one domain section (e.g. y<y*) may form a continuous region with the outer domain of the adjacent domain section (y>y*), wherein said domain sections have the same voltages (i.e. $V_{i(y<y^*)}=V_{j(y>y^*)}$).

FIG. 5 illustrates a cross-section of an ion mirror 10 that comprises five pairs of elongate mirror electrodes 15, 16, 17, 18, 19 with different voltages. The equipotential lines show the solution to the 2D Laplace equation which constitutes the ideal electrostatic field distribution $\Phi_0$. The solution was numerically found using the boundary-element method (BEM). Voltages of the electrodes were calculated to be $V_0=0$, $V_1=-7350$ V, $V_2=4565$ V, $V_3=3700$ V, $V_4=6000$ V.

Figure 7:
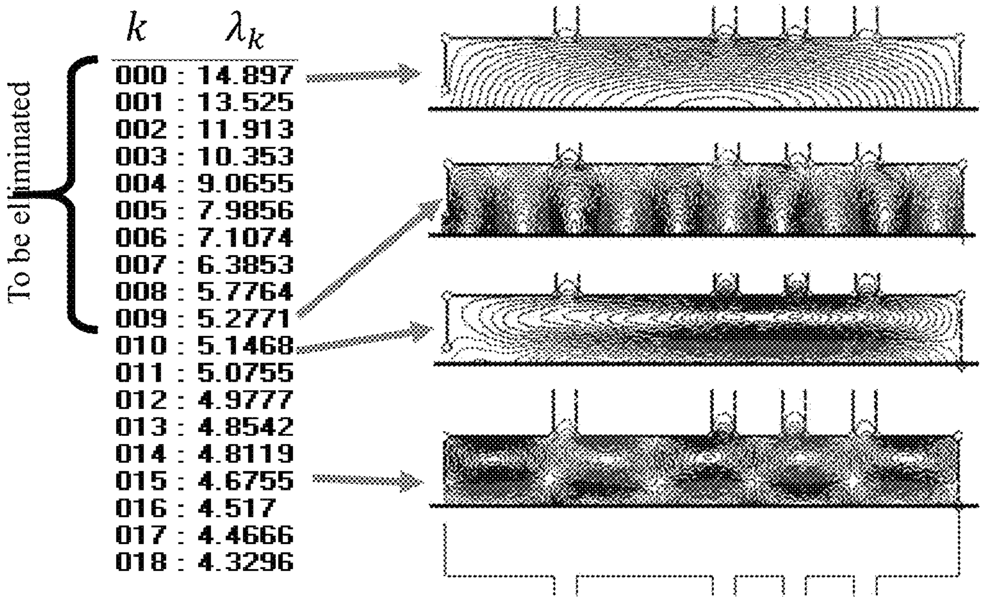
FIG. 7 is a diagram of a number of Laplace eigenfunctions in the in-mirror domain.
Figure 8:
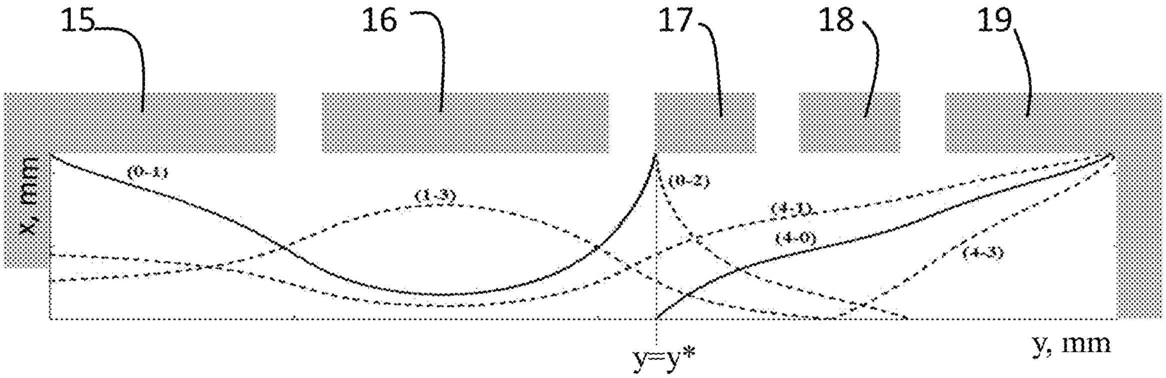
FIG. 8 shows a diagram of calculated candidate boundaries for the boundaries dividing subdomains that bear voltages $V_i$ (middle) and $V_j$ (outer) for different pairs of voltages (i-j) for the ion mirror of FIG. 6.

FIG. 7 shows a number of Laplace eigenfunctions in the in-mirror domain with the longest penetration. According to this example, the FFC assembly 100 is designed to compensate for the top 10 eigenfunctions with the greatest amplitudes. FIG. 7 shows the penetration length $\lambda_k$ associated with each of the k eigenfunctions. FIG. 7 also shows a graphic illustration of some of the eigenfunctions.

Where the number of available voltages is more than two (e.g. more than two mirror electrode voltages are available), there may be a degree of freedom to define the number of domain sections provided, and thus the total number of middle and outer domains. FIG. 8 shows calculated candidates for the boundaries between subdomains that bear voltages $V_i$(middle) and $V_j$(outer) for different pairs of voltages (i–j). The choice of voltage pairs is not unique, practical feasibility and design simplicity are to be considered. So, one possible solution using only the minimal and the maximal voltages $V_1$ and $V_4$ (labelled (4-1) in FIG. 8) defines a single middle domain extending across the FFC assembly 100 in the reflection direction y, with associated outer domains (due to x-symmetry). Accordingly, the curves defined by the boundaries between the middle and two outer domains for solution (4-1) define a FFC assembly 100 comprising three electrodes: the middle electrode biased as $V_4$ and the two outer electrodes (sitting both sides due to x-symmetry) biased as $V_1$. In some cases, such a design may not be practical due to the presence of adjacent electrodes with high voltage differences, including the electrodes of the mirror themselves.

FIG. 8 also shows two possible solutions using two domain sections. For example, the FFC assembly 100 shown in FIGS. 3, 4 and 6 is based on a combination of voltage pairs ($V_0$–$V_1$) in the domain $y<y^*$ and ($V_4$–$V_0$) in the domain $y>y^*$. This solution is realized with three domains $\omega_0$, $\omega_1$, and $\omega_4$ bearing corresponding voltages. The number of correcting electrodes is four because the domain $\omega_1$ is not connected and consists of two parts both sides of the axis x. A further possible solution is also shown for the voltage pairs (1-3) and (4-3).

Thus, by following the above design principles, the shape of the boundary gaps 110*a*, 110*b*, 110*c* for the FFC assembly 100 may be selected, wherein the lines defining the boundaries between domains $\omega_0$, $\omega_1$, and $\omega_4$ define a center line for each boundary gap 110*a*, 110*b*, 110*c*. Consequently, appropriately shaped electrodes 102, 104, 106, 108 may be provided. Where the electrodes 102, 104, 106, 108 are to bear the same voltage as an elongate mirror electrode 15, 16, 17, 18, 19, the respective electrode 102, 104, 106, 108 is connected to the elongate mirror electrode 15, 16, 17, 18, 19 with a conductive fastener 120. Where a connection between a FFC electrode and a mirror electrode having different voltages is desired (e.g. for mechanical stability), a dielectric fastener 122 may be used.

It will be appreciated that the electrodes 102, 104, 106, 108 may be fabricated with better precision than electrodes formed from PCBs or resistive coating known in the art. Preferably, the electrodes 102, 104, 106, 108 of the FFC assembly 100 are activated with voltages already present in the ion-optical system for other purposes. More preferably, these voltages are a subset of the mirror voltages applied to the elongate mirror electrodes 15, 16, 17, 18, 19 of the ion mirror 10.

In some embodiments, a small tunable calibration voltage may be used to compensate for small errors in construction, for example replacing a grounded compensation electrode voltage with a controller configured to apply a calibration voltage. In some embodiments, the calibration voltage may be provided by a +/−50V range DC supply from a controller (not shown) or the like. Alternatively, the calibration voltage from the controller may be superimposed onto another FFC voltage for the purpose of tuning the FFC potential.

As discussed above, to ensure accurate positioning of the electrodes 102, 104, 106, 108 and shorten tolerance chains, the electrodes 102, 104, 106, 108 are mounted directly on the elongate mirror electrodes 15, 16, 17, 18, 19 with the use of conductive fasteners 120 and dielectric fasteners 122.

Of course, it will be appreciated that the present disclosure is not limited to such a design of FFC assembly 100. In some embodiments, electrodes 102, 104, 106, 108 of the FFC assembly may be accurately mounted to a substrate (e.g. a flat ceramic or PCB plate), and then that substrate inserted into slots cut into the elongate mirror electrodes 15, 16, 17, 18, 19. In some embodiments, the electrodes may be printed onto a PCB, although such an implementation may be prone to drift due to the nature of the construction of the PCB based electrodes.

According to this disclosure a method of time of flight mass spectrometry for a time of flight mass spectrometer may be provided. For example, the method may be performed by the MR ToF shown in FIG. 2. The method comprises applying mirror electrode voltages (e.g. mirror electrode voltages $V_0$ to $V_4$) to respective mirror electrodes 15, 16, 17, 18, 19 of the ion mirrors 10*a*, 10*b*. FFC voltages are then applied to the electrodes of the FFC assembly 100. In the embodiment of FIG. 2, the FFC voltages are defined by the mirror electrode voltages by way of the conductive fasteners 120.

FIGS. 9A and 9B show graphs of the electric field error against the distance from the fringe for a non-compensated ion mirror (FIG. 9A) and an ion mirror including the FFC assembly 100 of this disclosure (FIG. 9B). Without correction, the error follows the asymptote line of about 800*exp (−z/13 mm). Including the correcting potential, the error follows the asymptote line of about ~1000*exp(−z/5.3 mm). Thus, it can be seen that the FFC assembly 100 reduces the effective penetration length by a factor of 13 mm/5.3 mm=2.5. That is to say, as a result of correction the field error falls down to 1V at the distance of 40 mm (corrected) compared to 90 mm (not corrected) and continues decreasing with an accelerated rate. Thus, it will be appreciated that the FFC assembly 100 increases the available space in the drift direction of the ion mirror 10 for ions to be reflected.

According to the method, ions are injected into the MR-ToF from the ion trap 2. Ions are then reflected between the two ion mirrors 10*a*, 10*b* before being detected by the detector 7. FIG. 10 shows an intensity map of ions (transmittance) measured in the MR-ToF of FIG. 2, when scanning the steering deflector 4 voltage that defines the angle of ion injection and the voltage applied to the correction stripes 5, 6. This pair of voltages defines the maximum drift of the ions along the ion mirrors to the point when the drift is reversed. The transmittance visibly vanishes at high injection angles which makes the ions come too close to the mirror ends where they are dispersed by the fringe field perturbation. Thus it will be appreciated that by reducing the fringe field perturbation through use of the FFC assembly 100, ions may drift along the ion mirrors 10*a*, 10*b* for longer distances. This increases the number of oscillations between the mirrors 10*a*, 10*b* and, therefore, the total length of flight.

The invention claimed is:

1. An ion mirror for a time of flight mass spectrometer (ToF), the ion mirror elongated from a first end to a second end along a drift direction (z) and configured to reflect ions in a reflection direction (y) orthogonal to the drift direction, the ion mirror comprising:

a plurality of elongate mirror electrodes, each of the elongate mirror electrodes extending in the drift direction, each of the plurality of elongate mirror electrodes configured to receive a respective mirror electrode voltage in order to provide an electrostatic field of the ion mirror; and a Fringe Field Correcting (FFC) assembly provided at the first end or the second end of the ion mirror, the FFC assembly comprising a plurality of electrodes, the plurality of electrodes extending in a plane orthogonal to the drift direction, each electrode configured to receive a respective FFC voltage, wherein the FFC assembly is configured to suppress a fringe field of the electrostatic field of the ion mirror when biased with the FFC voltages, and wherein the FFC assembly is configured to suppress K harmonics with the longest penetration lengths of the fringe field of the electrostatic field of the ion mirror, and wherein K is a positive integer.

2. The ion mirror according to claim 1, wherein at least two electrodes of the FFC assembly are configured to receive a voltage selected from the group of mirror electrode voltages applied to the plurality of elongate mirror electrodes.

3. The ion mirror according to claim 2, wherein each electrode of the FFC assembly is configured to receive a voltage selected from the group of mirror electrode voltages to be applied to the plurality of elongate mirror electrodes.

4. The ion mirror according to claim 2, wherein the FFC assembly comprises at least three electrodes, and wherein one electrode of the FFC assembly is configured to receive a calibration voltage in order to reduce at least one harmonic of the fringe field of the electrostatic field of the ion mirror.

5. The ion mirror according to claim 1, wherein the FFC assembly is symmetrical about a y-z plane in which the ions are reflected and drift.

6. The ion mirror according to claim 1, wherein the plurality of electrodes of the FFC assembly are separated from each other by a plurality of boundary gaps extending in the plane of the FFC assembly.

7. The ion mirror according to claim 1, wherein the elongate mirror electrodes of the ion mirror define a rectangular internal cross section of the ion mirror having a length b in the reflection direction and a width a in a direction normal to the reflection direction and the drift direction.

8. The ion mirror according to claim 1, wherein the electrostatic field of the ion mirror comprises the fringe field and an idealized field ($\Phi_0$ (x, y)), wherein the idealized field is substantially independent of the drift direction (z).

9. The ion mirror according to claim 8, wherein the plurality of electrodes of the FFC assembly are separated from each other by a plurality of boundary gaps extending in the plane of the FFC assembly;

the elongate mirror electrodes of the ion mirror define a rectangular internal cross section of the ion mirror having a length b in the reflection direction and a width a in direction normal to the reflection direction and the drift direction; and the shapes of the boundary gaps are defined by a set of non-overlapping domains (ω) where the voltage to be applied to a FFC electrode corresponding to a middle domain is $V_i$, and the voltage to be applied to a FFC electrode corresponding to an outer domain is $V_j$, where:

$$U(x, y) = \begin{cases} V_i, & -\delta\omega(y) < x < \delta\omega(y) \\ V_j, & \text{otherwise} \end{cases}$$

$$\text{where: } \delta\omega(y) = \frac{a}{\pi}\operatorname{asin}\frac{\Phi_{av}(y) - V_j}{V_i - V_j}$$

$$\text{and: } \Phi_{av}(y) = \frac{\pi}{a}\int_0^{a/2} \Phi_0(x, y)\cos\frac{\pi x}{a}dx.$$

10. The ion mirror according to claim 1, wherein the FFC assembly is mounted to the ion mirror.

11. The ion mirror according to claim 10, wherein the FFC assembly comprises a plurality of conductive mounting pins, the conductive mounting pins configured to electrically connect one or more electrodes of the FFC assembly to the one or more elongate mirror electrodes where the FFC voltage is to be the same as the mirror electrode voltage of the respective elongate mirror electrode.

12. A time of flight mass spectrometer comprising:

an ion source;

an ion detector; and an ion mirror according to claim 1 configured to reflect ions on a flight path between the ion source and the ion detector.

13. The time of flight mass spectrometer according to claim 12, further comprising a further ion mirror, wherein the ion mirror and the further ion mirror are arranged opposing each other and configured to reflect ions between the ion mirror and the further ion mirror.

14. The time of flight mass spectrometer according to claim 13, wherein each of the ion mirror and the further ion mirror comprises a first FFC assembly at a first end of the respective ion mirror and a second FFC assembly at a second end of the respective ion mirror.

15. A method of time of flight mass spectrometry for a time of flight mass spectrometer comprising:

applying mirror electrode voltages to respective mirror electrodes of an ion mirror according to claim 1, the ion mirror arranged within the time of flight mass spectrometer;

applying FFC electrode voltages to the at least one FFC assembly of the ion mirror;

injecting ions into the time of flight mass spectrometer;

reflecting the ions using the ion mirror; and detecting the ions.

* * * * *